(No Model.)
G. C. HENNING.
ROOF MAKING APPLIANCE.
No. 559,132. Patented Apr. 28, 1896.
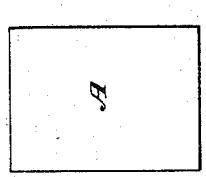
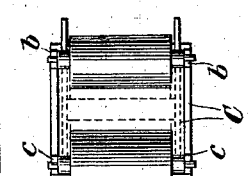
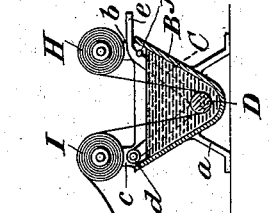
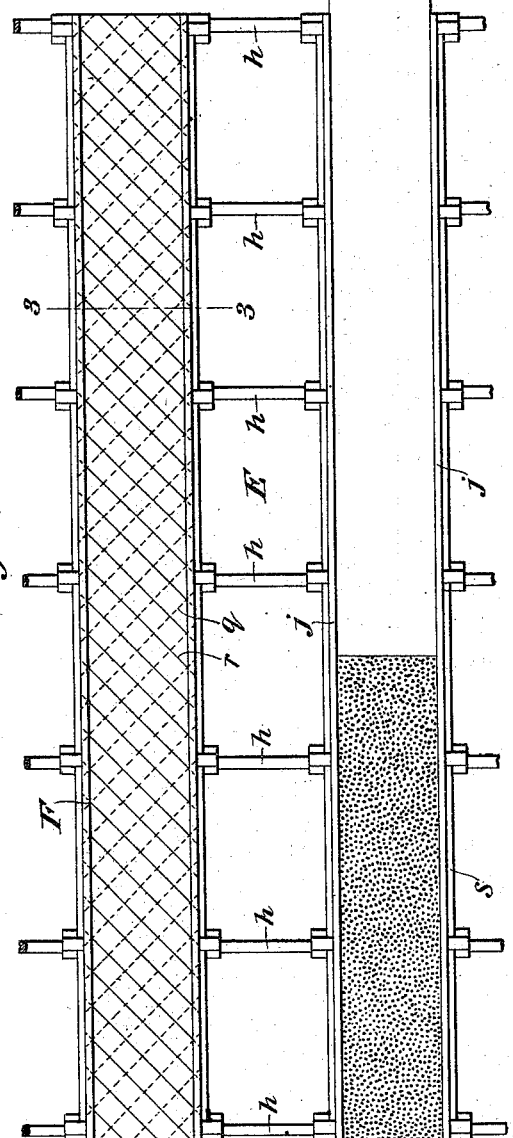
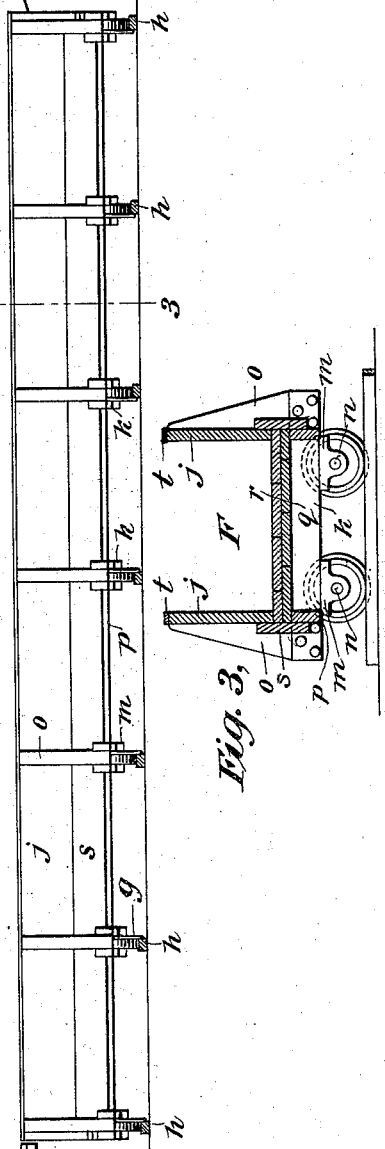
Witnesses
C. E. Ashley
H. W. Lloyd
Inventor
Gus. C. Henning,
By his Attorneys
Wilcox & Barkley.

UNITED STATES PATENT OFFICE.

GUSTAVUS C. HENNING, OF NEW YORK, N. Y.

ROOF-MAKING APPLIANCE.

SPECIFICATION forming part of Letters Patent No. 559,132, dated April 28, 1896.

Application filed June 14, 1893. Serial No. 477,592. (No model.)

*To all whom it may concern:*

Be it known that I, GUSTAVUS C. HENNING, a citizen of the United States, and a resident of the city of New York, in the county of New York and State of New York, have invented certain new and useful Improvements in Roof-Making Appliances, of which the following is a specification.

My invention has for its objects to increase the product of a plant for the manufacture of graveled or sanded web roofing material, (thus with apparatus as heretofore used the receiver for the waterproofed roofing material is stationary, and when it is filled to a limit dependent on the season and other factors the operation has to be suspended until the same can cool sufficiently to permit of its removal, although there may be a lot of unused waterproofing material left melted in the kettles, unless there has been a successful guess;) to improve the quality and make uniform the appearance of said product, and other objects, as will hereinafter appear.

To these ends my invention consists of the devices and combinations of devices hereinafter described, and more particularly pointed out in the claims concluding this specification.

The preferred form of my invention is shown in the accompanying drawings, forming part of this specification, in which—

Figure 1 is a plan view showing a running kettle, a railway, and two of my new receiving-cars. Fig. 2 is a side elevation of my said receiving-cars and a vertical cross-section of the running kettle; and Fig. 3 is a transverse section, on lines 3 3, Figs. 1 and 2, of the receiving-car.

Referring to the drawings and the references marked thereon, the reference A marks two melting-kettles wherein the waterproofing composition to be applied to the felt, paper, or cloth, &c., roofing material is mixed, gaged, and melted down, and whence it is dipped or run into the running kettle B. The latter kettle is made in the form of a V-trough with closed ends and is supported on masonry or legs $a$ over a furnace. The whole is preferably of metal. The waterproofing material is kept molten in the kettle B by any heating device (not shown) thereunder. The kettle B is provided with uprights $b\ b$ and $c\ c$ at or near the corners thereof, said uprights being formed with suitable seats to receive the ends of shafts carrying the material to be waterproofed. The kettle B has a V-frame C pivoted thereto at $d$. The said V-frame is or may be formed of two parts pivoted together at the point of the V. This frame C is provided with handles $e$ and rests against pins or stops $f$ (but one stop being shown) on the kettle B; also, a guide-roller D is journaled at or near the point of the V-frame C.

At one side of the kettle B, I place a railway E, (shown as having seven parallel rails $h$, though their number may be varied to suit the case,) and on this railway I place a number of long narrow cars or troughs F on flanged wheels $g$, resting on the rails $h$ of the railway. These cars or troughs are long and wide enough to receive any length desired of the web material flat thereon, and preferably have sides $j$ thereto to keep the layers of roofing in place while cooling, and to furnish a track for the gravel or sand distributer G, which is or may be of usual construction and operation. These cars F are shown as formed of transverse beams $k$, placed adjacent each other in pairs, with bearings $m$ suitably secured thereto for the journals $n$ of the wheels $g$; of side braces $o$, secured between the projecting ends of the beams $k$ by bolts or otherwise; of longitudinal braces $p$, placed between and against the beams $k$ at each side of the car; of a double floor or girder formed of planks diagonally laid, as at $q\ r$, the planks of one part crossing those of the other, (see Fig. 1,) the planking of the sides $j$ resting on top of the flooring, and side bracing planks $s$ between and against the side braces $o$, and secured to the sides $j$ and braces $p$, being shouldered at the ends to fit over the beams $k$. The planks $q\ r$ are secured to each other and to the beams $k$ and the braces $p$. The sides $j$ are secured to the side braces $o$, and the planks $s$ to the flooring, the braces $p$, and the sides $j$. Strips $t$, of metal, may be placed on top of the sides $j$ to receive the wheels of the car G—that is, the floor of the trough or car forms the web, while the sides or parts $p\ o\ s$ form the chords of a girder.

The material to be waterproofed is in rolls. By pulling on the handles the frame C is caused to become extended or lose its V form, whereby the roller D is brought above the molten material in the kettle, so that the end of the web from roll H, supported by standards b, can be led thereunder. The frame is then allowed to resume its V form, the notched-in handles e being caught on and supported by the stops f. A second roll I is supported by a shaft placed on the bearings c c, and the end from roll H is brought over roll I and the ends of the two webs brought into register. The second web from roll I gets its waterproofing material from the surplus on the web from roll H. (In practice as roll H is exhausted the end of another roll is or may be secured to the end of the web of roll H and be led thereby under the roller D, the two ends being separated again afterward.) Instead of being inside the standards b b the handles e may be carried over the sides of the kettle—that is, they may have offsets—and be outside the ends of the shaft of the roll H, whereby the frame C may be fixed or rigid in its V form and then could be moved regardless of said roll or shaft.

One of the cars or troughs is shown in Fig. 1 as receiving the webs from the running kettle and the webs as being partly covered by gravel or sand. The sand or gravel hoppers may receive their charge from a storage platform and chute overhead, or may be run on a connecting-track at the end of the trough or car to the piles of dried sand or gravel beyond.

With the apparatus shown it is common for workmen to get the webs on the cars or troughs and the sanding done in about one-half minute. Other layers are at once run out and placed in like manner until the desired number is had or the car filled, when it is moved aside in a direction at right angles to its length (it being noted that its special construction prevents any bending or buckling) and another (empty) car run into place to receive the roofing material. Thus instead of stopping manufacturing, when a fixed trough is filled to its capacity, as many movable troughs or cars may be filled as are necessary to use up all material which can be melted in the kettles. As in summer weather one trough or car full cannot cool off or set in twenty-four hours, the operations can be carried on only intermittently when troughs are stationary or fixtures, while with my invention a sufficient number of cars overcomes the entire difficulty, as they can be standing aside cooling while other spare cars are brought into use, allowing continuous operations at all times. This is essential, as the material cannot be rolled up for transportation until quite cool, as it would stick together and also become discolored when rolled up while warm. The material on the cars cools uniformly and when cooled is of uniform quality and color throughout. I am not aware that this last result has ever been attained heretofore.

Many changes in the details of my invention may be made without departing in any wise from the spirit thereof. Thus the floor or web of the trough or girder may be made of one or more thicknesses of plate metal, so also of the chords or sides thereof.

Having thus fully described my invention, what I claim as new, and desire to secure by Letters Patent, is—

1. In a roof-making apparatus, the combination of the running or waterproofing kettle, a railway adjacent to said kettle and extending transversely to the direction of delivery of the roofing therefrom, interchangeable cars on said railway, a railway on each car extending lengthwise thereof, a distributing-car constructed to run on said lengthwise railways, and a stationary railway or platform to receive said distributing-car, substantially as and for the purposes described.

2. In a roof-making apparatus, the combination of the running or waterproofing kettle, a transverse railway adjacent thereto, a receiving-car on said railway, and a distributing-car constructed to run longitudinally of said receiving-car, substantially as described.

In testimony that I claim the foregoing as my invention I have signed my name, in presence of two witnesses, this 11th day of May, 1893.

GUSTAVUS C. HENNING.

Witnesses:
CHARLES A. BRODEK,
RICHARD W. BARKLEY.